Feb. 21, 1956     E. V. BOWLES ET AL     2,735,722
SPIRALED HUB FOR TRACTOR REAR WHEELS
Filed Dec. 21, 1951
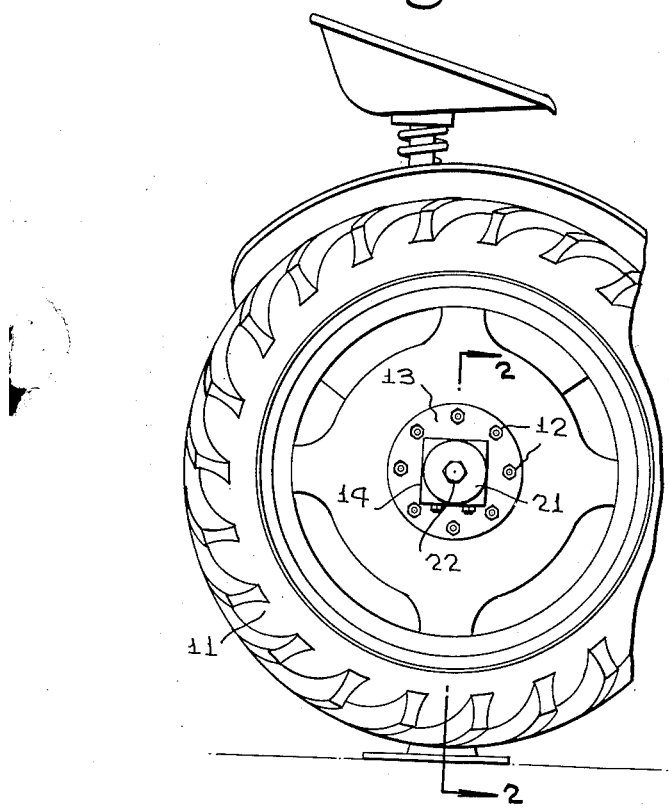
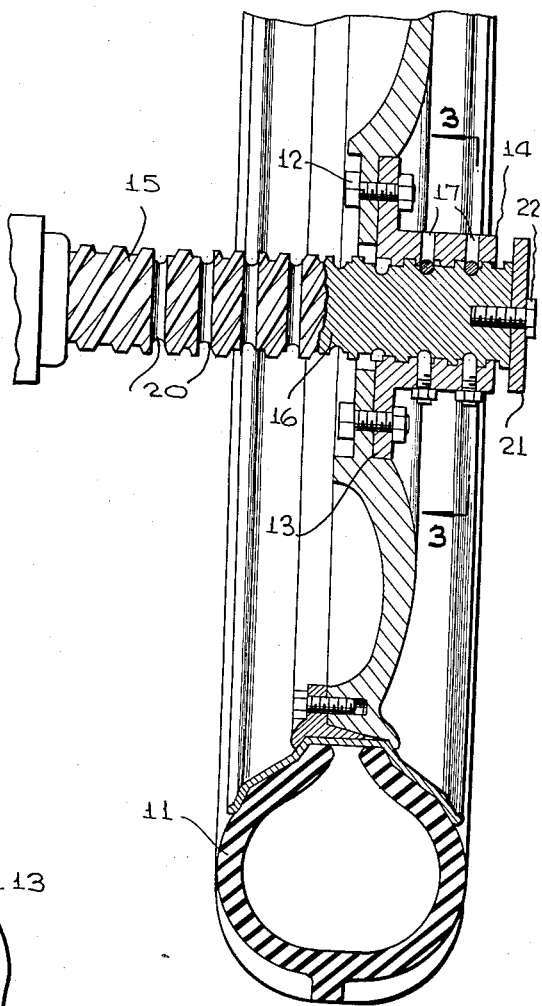
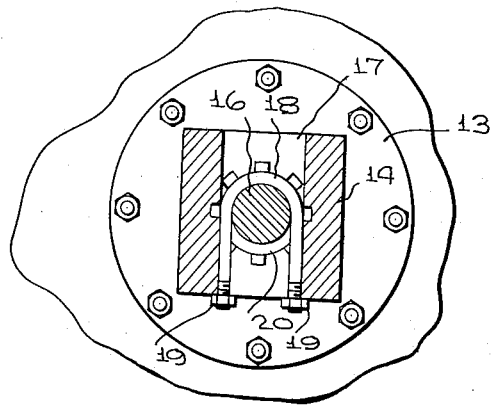
INVENTORS
EUGENE V. BOWLES
GERALDINE C. BOWLES
BY
McMorrow, Berman + Davidson
ATTORNEYS

United States Patent Office 2,735,722
Patented Feb. 21, 1956

2,735,722
SPIRALED HUB FOR TRACTOR REAR WHEELS

Eugene Victor Bowles and Geraldine C. Bowles, Strathmore, Calif.

Application December 21, 1951, Serial No. 262,829

1 Claim. (Cl. 301—1)

This invention relates to adjustable tractor rear wheels, and more particularly to an improved hub and axle assembly for a tractor rear wheel.

A main object of the invention is to provide a novel and improved adjustable hub and axle for the rear wheel of a tractor, whereby the spacing between the rear wheels of the tractor may be readily adjusted in accordance with the distance between rows of different crops when the tractor is used in planting, cultivating, harvesting, and similar operations, the improved assembly involving simple components, being easy to adjust, and being rugged in construction.

A further object of the invention is to provide an improved adjustable hub and axle assembly for the rear wheels of a tractor, said assembly involving inexpensive components, providing a secure connection between the hub and the axle, and being readily adjustable to provide desired spacing between the rear wheels of the tractor with a minimum amount of effort and in a short time.

Further objects and advantages of the invention will become apparent from the following description and claim, and from the accompanying drawings, wherein:

Figure 1 is a fragmentary front elevational view of a tractor rear wheel supported on an improved hub and axle assembly according to the present invention.

Figure 2 is an enlarged cross sectional view taken on the line 2—2 of Figure 1.

Figure 3 is a cross sectional detail view taken on the line 3—3 of Figure 2.

Referring to the drawings, 11 designates the rear wheel of a tractor which is secured by means of bolts 12 to the annular flange 13 of a hub 14. The hub 14 is substantially square in cross section and is formed with internal threads which are threadedly engaged with the spiral threads 15 formed on the axle 16.

The main body of the hub 14 is formed with a pair of transverse slots 17 extending normal to and including the axle 16, said slots 17 being slightly longer than the diameter of the axle 16, the axle being substantially centered in the slots, as shown in Figure 3. Designated at 18 are respective U-bolts engaged in the slots over the axle 16, the legs of the U-bolts extending outside of the hub 14 and being provided with the clamping nuts 19, 19, as shown in Figure 3. The axle 16 is formed with a plurality of spaced peripheral grooves 20 adapted to receive the bight portion of the U-bolts 18, the spacing of the peripheral grooves 20 being the same as the spacing between the slots 17. By the above illustrated and described arrangement, the hub 14 may be adjusted to any one of a number of different predetermined positions on the axle 16 and locked in adjusted position by the engagement of the bight portions of the U-bolts 18 in the annular grooves 20 and the clamping action obtained by tightening the nuts 19. To release the hub 14 for adjustment on the axle 16, it is merely necessary to unfasten the nuts 19, remove the U-bolts 18, and rotate the hub 14 on the axle 16 until it has been moved to its desired position. It will be understood that the rear wheel 11 will be jacked up during the above adjustment procedure. After the hub 14 has been rotated to its desired position on the axle 16, the U-bolts 18 are inserted into the slots 17, are seated in the peripheral grooves 20, and are then secured by fastening the nuts 19 on the ends of the U-bolts and tightening said nuts into engagement with the bottom surface of the hub 14.

An enlarged circular stop plate 21 is secured to the end of the axle 16, as by a fastening bolt 22, as shown in Figure 2, to limit outward adjustment of the hub 14 relative to the axle 16 and to prevent said hub from becoming disengaged from the axle during the adjustment of the hub on the axle.

While a specific embodiment of an improved hub and axle assembly for the rear wheels of tractors has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a tractor rear wheel and axle assembly, a rear axle formed with a spiral thread and with longitudinally spaced peripheral grooves extending around the axle and intersecting the thread, each groove being contained in a respective plane perpendicular to the axis of the axle, an internally threaded hub on said axle and engaged with said spiral threads, said hub being adjustable along the axle by rotating the hub relative to said axle, said hub being rectangular in cross section and being formed with a transverse slot normal to opposing surfaces of the hub and including said axle, said slot extending completely through the hub and being longer than the diameter of the axle, a U-shaped clamping bolt engaged on said axle in said slot and having its bight portion received in one of said peripheral grooves, the legs of said bolt extending outside the periphery of said hub, and clamping nuts engaged on said legs and bearing against said periphery.

References Cited in the file of this patent

UNITED STATES PATENTS

| 840,249 | Patton | Jan. 1, 1907 |
| 1,272,200 | Bowers | July 9, 1918 |
| 1,286,713 | Montucchiaro | Dec. 1, 1918 |
| 2,324,681 | Dekker | July 20, 1943 |
| 2,591,253 | Grismore | Apr. 1, 1952 |

FOREIGN PATENTS

| 22,284 | Great Britain | 1909 |
| 474,021 | France | Mar. 13, 1914 |